(12) United States Patent
Hyllander et al.

(10) Patent No.: US 7,065,199 B1
(45) Date of Patent: Jun. 20, 2006

(54) COMMUNICATION SYSTEM INCLUDING MEANS FOR TRANSMITTING INTERNET ADDRESSES VIA SMS

(75) Inventors: Klas Hyllander, Stockholm (SE); Mats Olof Winroth, Tyreso (SE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/485,707

(22) PCT Filed: Jul. 8, 1998

(86) PCT No.: PCT/SE98/01349

§ 371 (c)(1),
(2), (4) Date: Jun. 28, 2000

(87) PCT Pub. No.: WO99/12365

PCT Pub. Date: Mar. 11, 1999

(30) Foreign Application Priority Data

Aug. 29, 1997 (SE) .................................... 9703121

(51) Int. Cl.
*H04M 3/42* (2006.01)
*H04Q 7/20* (2006.01)

(52) U.S. Cl. .............................. 379/211.02; 455/414.1; 455/466

(58) Field of Classification Search ............. 455/414.1, 455/414.3, 466, 415, 422.1; 370/352, 389; 379/211.02
See application file for complete search history.

(56) References Cited

U.S. PATENT DOCUMENTS

| 5,938,721 | A | * | 8/1999 | Dussell et al. ............... 701/211 |
| 5,943,399 | A | * | 8/1999 | Bannister et al. ......... 379/88.17 |
| 5,946,629 | A | * | 8/1999 | Sawyer et al. ............... 455/466 |
| 5,949,866 | A | * | 9/1999 | Coiera et al. .......... 379/211.02 |
| 6,014,379 | A | * | 1/2000 | White et al. ................. 370/389 |
| 6,075,783 | A | * | 6/2000 | Voit ........................... 370/352 |
| 6,112,099 | A | * | 8/2000 | Ketola ........................ 455/466 |
| 6,125,281 | A | * | 9/2000 | Wells et al. ................ 455/466 |
| 6,151,628 | A | * | 11/2000 | Xu et al. ..................... 709/225 |
| 6,169,734 | B1 | * | 1/2001 | Wilson ....................... 370/352 |
| 6,570,871 | B1 | * | 5/2003 | Schneider ................... 370/356 |

FOREIGN PATENT DOCUMENTS

| EP | 0 795 991 | 9/1997 |
| WO | WO 97/13382 | 4/1997 |
| WO | WO 97/31498 | 8/1997 |
| WO | WO 98/11744 | 3/1998 |

\* cited by examiner

*Primary Examiner*—Simon Nguyen
(74) *Attorney, Agent, or Firm*—Oblon, Spivak, McClelland, Maier & Neustadt, P.C.

(57) ABSTRACT

A communication system, adapted to establish connections to, and between, Internet users, including a cellular radio communication network adapted to provide a short message service (SMS), and a server adapted to facilitate the establishment of a telephony/Internet connection between a mobile subscriber station of said network and an Internet user. SMS is used to transfer, from the mobile subscriber station to the server, information identifying the Internet address for the Internet user and, from the server to the mobile subscriber station, information relating to the required connection between the mobile subscriber station and the Internet user.

38 Claims, 2 Drawing Sheets

COMMUNICATION SYSTEM INCLUDING MEANS FOR TRANSMITTING INTERNET ADDRESSES VIA SMS

BACKGROUND OF THE INVENTION

1. Field of the Invention

The invention relates to a communication system including a cellular radio communication network, such as a Global System for Mobile Communication (GSM) network, that is adapted to enable a GSM subscriber to make an Internet telephone call to an Internet user. In particular, a 'short message service' (SMS) is used to transfer address information for the Internet user to an Internet server. The invention also relates to a method for enabling a GSM subscriber to make an Internet telephone call to an Internet user using SMS to transfer address information for the Internet user.

2. Discussion of the Background

It is highly probable that, within a few years, a very large proportion of the population of, for example, Sweden, will use the Internet in their day-to-day activities for a number of purposes, including, inter alia:

entertainment;
electronic shopping/banking;
retrieving information in respect of a wide range of subject matter;
as an information bank; and
person-to-person communication.

At the present time, e-mail is the major Internet application, but it would clearly be of advantage to telephone subscribers if Internet telephony became, in the long term, a readily available subscriber service for personal communication. Forecasts envisage that Internet traffic, as compared with present day levels, could be increased many times by telephony. For a telephone operator, this is a development which, although it could reduce revenues, will give rise to major developments in, and/or opportunities for, new subscriber services.

At the present time, a number of different Internet telephony solutions are currently available and in commercial operation.

The main advantage of known Internet telephony services is that the cost of long-distance calls can be considerably reduced. This cost reduction is effected by using local access points for the telephone calls and by using the Internet for the long-range transportation/transmission of telephone traffic. Services already launched include, inter alia:

telephony from Internet-connected users to PSTN (Public Switched Telephone Network) subscribers, in which the PSTN subscriber is called by a local interworking server;
a service in which both A-subscribers and B-subscribers are PSTN-connected to local servers which have contact with each other via the Internet—it will be seen from the subsequent description of the present invention that, in the longer term, it will also be able to be transmit speech via GSM in the same manner.

The mobile cellular radio communication network, known as GSM, which is covered by standards developed and promulgated by the European Telecommunications Standards Institute (ETSI), offers a variety of services to users, other than voice, including, inter alia, data services, short message services, and broadcast services. The ETSI GSM Standards specify, in addition to the radio interface, a complete telecommunications network with radio access by the user. Since the architecture, and operational aspects, of GSM are well known to persons skilled in the art, only those aspects of GSM which are of direct relevance to the present invention will be described in this patent specification.

Thus, a GSM mobile connection is distinguished from a conventional PSTN connection in that the mobile station, apart from having access to speech services, can access a short message service (SMS).

SMS is a feature which is incorporated into digital mobile telephone networks, and can be divided into two types, point-to-point services (SMS-PP), and broadcast services (SMS-CB).

SMS-PP allows a brief message (up to 160 characters) to be sent between a mobile telephone and a Service Centre (SC). Larger messages can optionally be created by concatenating multiple messages (the protocol allows up to 10 messages to be concatenated in this way). The SC is adapted to send, or receive, messages from a wide variety of sources, in addition to a GSM mobile telephone, for example, fax, normal telephone, dial up modems, public, or private data networks etc. This means that the service is not limited to sending messages between GSM mobile telephones, but can be used to send, or receive, messages from the wider telecommunications network.

SUMMARY OF THE INVENTION

An advantage of using SMS, in the present invention, is that it can be used by a GSM subscriber to establish a telephone connection to an Internet-connected user, without any additional equipment being necessary.

It is an object of the present invention to provide a communication system including a cellular radio communication network, such as a Global System for Mobile Communication (GSM) network, that is adapted to use a short message service (SMS) to enable a GSM subscriber to make an Internet telephone call to an Internet user. In particular, SMS is used to transfer address information for the Internet user to an Internet server.

It is another object of the present invention to provide a method for enabling a GSM subscriber to make an Internet telephone call to an Internet user using SMS to transfer address information for the Internet user.

According to a first aspect of the present invention, there is provided, a communication system adapted to establish connections to, and between, Internet users, characterised in that said communication system includes a cellular radio communication network adapted to provide a short message service (SMS), and a server adapted to facilitate the establishment of a telephony/Internet connection between a mobile subscriber station of said network and an Internet user, and said SMS is adapted to transfer, from said mobile subscriber station to said server, information identifying the Internet address for said Internet user; and, from said server to said mobile subscriber station, information relating to said connection between said mobile subscriber station and said Internet user.

SMS may be used to transfer the following information to said telephony/Internet server:

(a) the Internet address for an Internet-connected computer terminal of said Internet user; and
(b) a specific identity for said mobile subscriber station, for example, a telephone number for said mobile subscriber station.

The telephony/Internet server may include analysing means for effecting, on receipt of said SMS-transferred information, an A-number analysis to determine the A-telephone number identity of said mobile subscriber station.

The telephony/Internet server may be adapted, in response to receipt of said SMS-transferred information from said mobile subscriber station, to send an SMS to said mobile subscriber station including the following information:
(a) that call connection to said Internet user is possible; and
(b) the server's telephone number.

The telephony/Internet server may be adapted, on receipt of a call from said mobile subscriber station, made using the server's telephone number, to identify said mobile subscriber station (calling party), associate the telephone call with the Internet address previously transferred to said server by said mobile subscriber station, and connect the telephone call to the Internet address.

The telephony/Internet server may be adapted to identify said mobile subscriber station (calling party) using said A-number analysing means. The Internet address may be associated with the A-telephone number of said mobile subscriber station for a specific period of time which is monitored by a system timer.

The telephony/Internet server may be adapted to connect the telephone call either directly to the Internet address, or to the Internet address via at least one additional Internet server, a server at the end of this chain being adapted to provide Internet telephony services.

The telephony/Internet server may include means for establishing and storing a list of Internet addresses for each mobile subscriber station user subscribing to the system, and each one of said Internet addresses may have an address list number.

The telephony/Internet server may be adapted, in response to receipt of said SMS-transferred information from said mobile subscriber station, to send an SMS to said mobile subscriber station including the following information:
(a) that call connection to said Internet user is possible;
(b) the server's telephone number; and
(c) an address list number for the Internet address, each address list number corresponding to one of the Internet addresses in the mobile subscriber station user's address list in the telephony/Internet server.

The address list numbers may be stored in a respective mobile subscriber station's telephone number list.

The mobile subscriber station may be adapted to request from said telephony/Internet server, and said telephony/Internet server may be adapted to supply to the mobile subscriber station, a complete listing of the Internet address list.

The mobile subscriber station may be adapted to search for a specific one of the Internet addresses stored by said telephony/Internet server.

The telephony/Internet server may be adapted, on receipt of a call connection request from a mobile subscriber station to an unlisted Internet address, to store, and assign an address list number to, the unlisted Internet address, and send back, to the mobile subscriber station, via SMS, the following information to enable a user of said mobile subscriber station to call said Internet address:
(a) the assigned address list number;
(b) the server's telephone number; and
(c) information that call connection is possible to the Internet address.

According to a second aspect of the present invention, there is provided, a method for enabling a mobile subscriber station of a cellular radio communication network to make an Internet telephone call to an Internet user, characterised by the use of SMS to transfer, from said mobile subscriber station to a telephony/Internet server, information identifying the Internet address for said Internet user; and, from said telephony/Internet server to said mobile subscriber station, information relating to said connection between said mobile station and said Internet user. This method may be further characterised by said SMS being used to transfer the following information to said telephony/Internet server: the Internet address for an Internet-connected computer terminal of said Internet user; and a specific identity for said mobile subscriber station, for example, a telephone number for said mobile subscriber station.

The method may be characterised by said telephony/Internet server, on receipt of said SMS-transferred information, using A-number analysis to determine the A-telephone number identity of said mobile subscriber station.

The method may be characterised by said telephony/Internet server, in response to receipt of said SMS-transferred information from said mobile subscriber station, sending an SMS to said mobile subscriber station including the following information: that call connection to said Internet user is possible; and the server's telephone number.

The method may be characterised by said mobile subscriber station calling the server's telephone number, and said server, on receipt of the call from said mobile subscriber station, identifying said mobile subscriber station (calling party), associating the telephone call with the Internet address previously transferred to said server by said mobile subscriber station, and connecting the telephone call to the Internet address. This method may be further characterised by said telephony/Internet server identifying said mobile subscriber station (calling party) using said A-number analysis.

The method may be characterised by associating said Internet address with the A-telephone number of said mobile subscriber station for a specific period of time, and by monitoring said period of time.

The method may be characterised by said telephony/Internet server connecting the telephone call either directly to the Internet address, or to the Internet address via at least one additional Internet server, a server at the end of this chain being adapted to provide Internet telephony services.

The method may be characterised by said telephony/Internet server establishing and storing a list of Internet addresses for each mobile subscriber station user wishing to make Internet telephone calls, and by each one of said Internet addresses having an address list number. This method may be further characterised by said telephony/Internet server, in response to receipt of said SMS-transferred information from said mobile subscriber station, sending an SMS to said mobile subscriber station including the following information: that call connection to said Internet user is possible, the server's telephone number, and an address list number for the Internet address, each address list number corresponding to one of the Internet addresses in the mobile subscriber station user's address list in the telephony/Internet server. This method may be further characterised by storing said address list numbers in a respective mobile subscriber station's telephone number list.

The method may be characterised by a mobile subscriber station requesting a complete listing of the Internet address list from said telephony/Internet server.

The method may be characterised by a mobile subscriber station searching for a specific one of the Internet addresses stored by said telephony/Internet server.

The method may be characterised by said telephony/Internet server, on receipt of a call connection request from a mobile subscriber station to an unlisted Internet address, storing, and assigning an address list number to, the unlisted Internet address; and by sending back, to the mobile subscriber station, via SMS, the following information to enable a user of said mobile subscriber station to call said Internet address: the assigned address list number, the server's telephone number, and information that call connection is possible to the Internet address.

According to a third aspect of the present invention, there is provided, a method for enabling a mobile subscriber station of a cellular radio communication network to make an Internet telephone call to an Internet user, characterised by a user of said mobile subscriber station sending the following information to a telephony/Internet server using SMS: information identifying the Internet address for said Internet user, and the specific identity of said mobile subscriber station (for example, the telephone number for the mobile subscriber station); said telephony/Internet server, in response to receipt of said information, sending an SMS to said mobile subscriber station, said SMS including the following information: that connection to said Internet address is possible, and the server's telephone number; a user of said mobile subscriber station, on receipt of the SMS from the server, calling the server's telephone number; and the server, on receipt of the telephone call from the mobile subscriber station, identifying the calling party (mobile subscriber station) using, for example, A-number analysis, associating the telephone call with the Internet address previously received in the SMS from the mobile subscriber station; and connecting the telephone call to the Internet address.

According to a fourth aspect of the present invention, there is provided, a method for enabling a mobile subscriber station of a cellular radio communication network to make an Internet telephone call to an Internet user, characterised by establishing and storing a list of Internet addresses for each mobile subscriber station user wishing to make Internet telephone calls; assigning, for each address in the Internet address list, a number which uniquely identifies these addresses; a user of said mobile subscriber station sending the following information to a telephony/Internet server using SMS: information identifying the Internet address for said Internet user, and the specific identity of said mobile subscriber station (for example, the telephone number for the mobile subscriber station); said telephony/Internet server, in response to receipt of said information, sending an SMS to said mobile subscriber station, said SMS including the following information: that connection to said Internet address is possible, the server's telephone number, and an address list number for the Internet address, each address list number corresponding to one of the Internet addresses in the mobile subscriber station user's address list in the telephony/Internet server; a user of said mobile subscriber station, on receipt of the SMS from the server, calling the server's telephone number; the telephony/Internet server, on receipt of the telephone call from the mobile subscriber station, transmitting a voice message to said mobile subscriber station requesting the user to key in an address list number; and, when said mobile subscriber station user keys in said address list number, said telephony/Internet server connecting the user of said mobile subscriber station to an Internet user at the Internet address corresponding to the address list number. This method may be further characterised by said telephony/Internet server, in the absence of a response from the Internet user, notifying the user of said mobile subscriber terminal by means of either a voice message, or tones, as in conventional telephony. This method may be further characterised by said notification being that the Internet user is engaged, or is not replying, or does not have an Internet telephony application.

The cellular radio communication network may be a GSM network.

BRIEF DESCRIPTION OF THE DRAWINGS

The foregoing and other features of the present invention will be better understood from the following description with reference to the accompanying drawings, in which.

DESCRIPTION OF THE PREFERRED EMBODIMENTS

Figure 1:
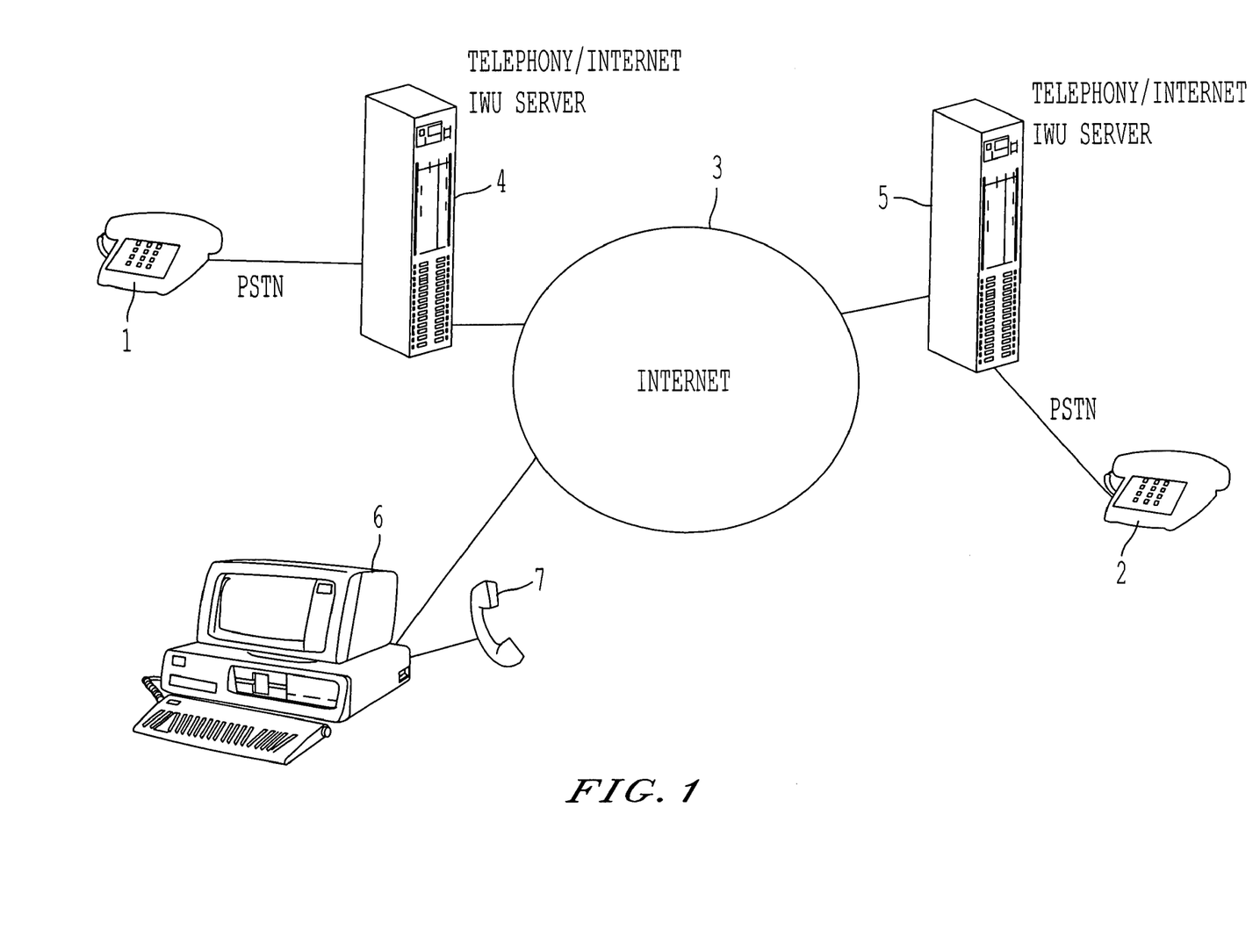
FIG. 1 diagrammatically illustrates a communication system having a number of different Internet telephony arrangements.

It will be seen from the communication system, which is diagrammatically illustrated in FIG. 1 of the accompany drawings, that:
(a) PSTN subscriber telephones 1 and 2, are respectively connectd to the Internet 3 via Telephony/Internet IWU (InterWorking Unit) Servers 4 and 5; and
(b) Internet users are connected to the Internet 3 by means of a user terminal 6 which is, in essence, a computer terminal, such as a personal computer, with a display screen and having a telephone handset 7 connected thereto. The Internet user terminal 6 is connected to the Internet 3 via a modem (not illustrated) and includes appropriate Internet software for facilitating the establishment of a connection to, and interaction with, the Internet 3.

In practice, a PSTN subscriber telephone, in FIG. 1, could be replaced by a GSM mobile station/handset and a GSM network, in which case, a MSC (Mobile Switching Centre) of the GSM network would be directly connected to an Internet server via 64 kbps PCM (Pulse Code Modulation).

The manner in which telephone calls are established, via the Internet 3, between the PSTN subscriber telephones 1 and 2 and/or between the Internet user terminal 6 and a PSTN subscriber telephone 1 or 2, is well known to persons skilled in the art and will not, therefore, be addressed, in great detail, by this patent specification.

In order to be able to interconnect speech to an Internet telephony user, via GSM, or conventional PSTN, it is necessary to have a coder which is adapted to re-code the PCM-coded speech data flow and to send this over the Internet. Equipment for effecting this task is readily available from a number of manufacturers. These equipments are, however, primarily based on either PSTN-to-PSTN, or Internet-to-PSTN. These models are easier to solve than a telephone call which originates in the PSTN, or GSM speech service, and terminates in the Internet.

The problem facing the GSM subscriber is how he/she is to address the Internet user without having access to an alphanumeric keyboard. The SMS service of GSM has an alphanumeric capability and can, therefore, be used for GSM/Internet telephony services.

If a B-subscriber (called party, or recipient) is PSTN-connected, the recipient's usual telephone number is specified on calling. Basically, by dialling the B-subscriber's telephone number, the Internet telephony server can connect to the Internet telephony server located nearest the B-subscriber and route the call to that server. The distant server, i.e. local to the B-subscriber, then calls the B-subscriber, and a call connection can be established.

However, if a GSM subscriber (A-subscriber, or calling party) wishes to make telephone contact with a third party (B-subscriber, or called party) who does not have a 'conventional' telephone number, but is connected to the Internet, i.e: is an Internet user, the A-subscriber must specify the recipient's (called party's) 'Web Phone Number'. This may be an Internet, or e-mail, address. It is difficult, if not impossible, to transfer this information from a GSM mobile station/handset, or from a conventional telephone, to the server. An Internet address, i.e. the IP (Internet Protocol) address, which is 12 digits long, can certainly be transferred by DTMF (Dual Tone Multifrequency). However, if the calling party only has the e-mail address, i.e. a DNS (Domain Name System) address, and not the Internet address (IP address), for an Internet user he/she wishes to call, it is difficult, if not impossible, for the calling party to establish a connection to the Internet user. Thus, in these circumstances, it will be necessary for the Internet address to be separately transferred to an Internet telephony server, and possibly also for a personal address list to be established in an Internet telephony server to which the user has a subscription. This can be effected, in accordance with the present invention, by using the GSM short message service (SMS), in a manner which will subsequently be described with reference to FIG. 2 of the accompanying drawings.

Figure 2:
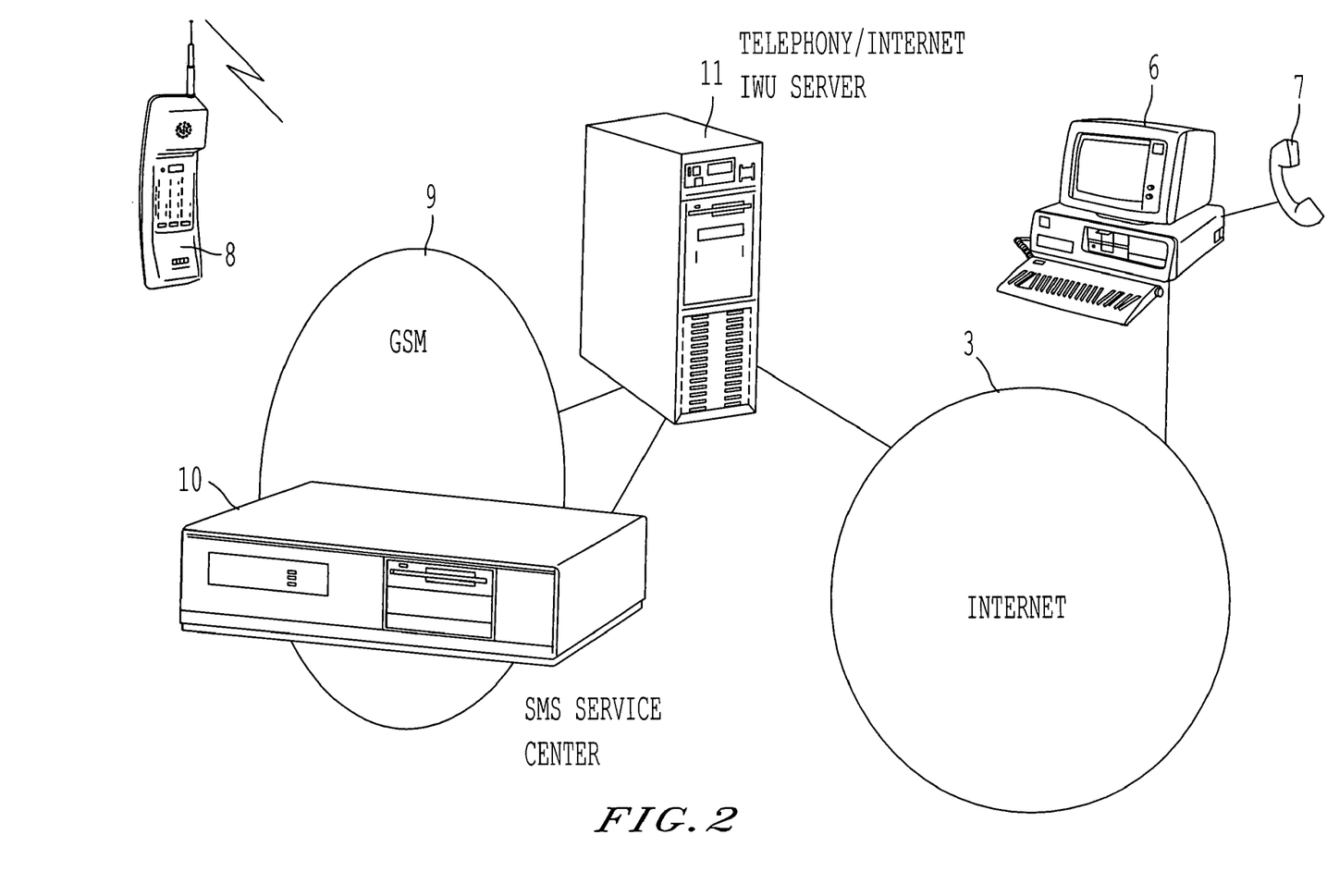
FIG. 2 diagrammatically illustrates a communication system according to the present invention.

It will be seen from FIG. 2 of the accompanying drawings, which diagrammatically illustrates a communication system according to the present invention, that the Internet user terminal 6/telephone handset 7 combination of FIG. 1 of the accompanying drawings, is also shown in FIG. 2, together with a GSM mobile station/handset 8, GSM network 9, SMS Service Centre (SC) 10 and Telephony/Internet IWU Server 11 which is connected to the GSM network 9 and the SMS SC 10. The communication system of FIG. 2 is adapted to connect a telephone call, originated by the GSM mobile station 8, to a user of the Internet terminal 6 using SMS to facilitate the transfer of the Internet address for the user terminal 6.

Thus, when a GSM subscriber wishes to make an Internet telephone call, using the mobile station 8, to an Internet-connected user, i.e. the user of the Internet user terminal 6, SMS is used to transfer the Internet address information, for the Internet user, to the Internet server 11 via the SMS Service Centre 10. With such an interconnection arrangement, several different scenarios are possible.

A first one of these scenarios, which provides the simplest solution, uses the GSM short message service (SMS) to transfer:

the Internet address information from the GSM mobile station 8 to the Telephony/Internet IWU (InterWorking Unit) server 11; and from the server 11 to the GSM mobile station 8, information for effecting the establishment of a telephony/Internet telephony connection between the GSM mobile station 8 and an Internet user, i.e. information which identifies the servers telephone number and which informs the GSM subscriber that a connection to the Internet user is possible.

On receipt of this information, the GSM mobile station 8 can then connect a telephone call to the server 11, which associates the telephone call with the previously sent Internet address for the Internet user. In operation, the following are sent to the interworking server 11 via SMS:

the Internet address to the destination computer, i.e. the Internet user terminal 6 of the called party; and the specific identity, for example, the specific telephone number for the GSM subscriber—an A-number analysis can be used to obtain the specific identity, which is why it need not be stated in plain language in the SMS message.

The server 11 responds with an SMS—this SMS includes information that a connection to the Internet user (Internet address) is possible, together with the telephone number for the interworking server 11.

The GSM subscriber can then call the server's telephone number and, on receipt of this call, the server 11 can, via an A-number analysis (see above), associate the telephone call to the Internet address previously sent in the first SMS. In practice, the Internet address is associated with the GSM A-telephone number for a specific period of time which is monitored by a timer which forms part of the communication system. The server 11 thereafter connects the telephone call either directly to the Internet user, or indirectly via at least one additional Internet server, a server at the end of this chain being adapted to provide Internet telephony services.

It will be seen, from the foregoing description of the first interconnection scenario, that a method, according to present invention, for enabling a mobile subscriber station of a cellular radio communication network to make an Internet telephone call to an Internet user, is characterised by the steps of:

(a) a user of said mobile subscriber station sending the following information to a telephony/Internet server using SMS:

information identifying the Internet address for said Internet user; and the specific identity of said mobile subscriber station (for example, the telephone number for the mobile subscriber station);

(b) said telephony/Internet server, in response to receipt of said information, sending an SMS to said mobile subscriber station, said SMS including the following information:

that connection to the Internet address is possible; and the server's telephone number;

(c) a user of said mobile subscriber station, on receipt of the SMS from the server, calling the server's telephone number; and (d) the server, on receipt of the telephone call from the mobile subscriber station, identifying the calling party (mobile subscriber station) using, for example, A-number analysis;

associating the telephone call with the Internet address previously received in the SMS from the mobile subscriber station; and connecting the telephone call to the Internet address.

The advantages of this interconnection arrangement are that the Telephony/Internet server 11 does not need to know the identity of the GSM subscriber, and no subscription is needed.

If a GSM operator is in possession of appropriate equipment, debiting charges for the telephone can be effected, in a manner know to persons skilled in the art, without any very serious problems.

Another one of the interconnection scenarios, which is a more advanced version of the first interconnection scenario, involves the establishment of an address list in the Internet telephony server 11. In this case, the GSM subscriber will have a subscription with an Internet telephony service provider.

This, more advanced, scenario uses the same SMS, as outlined above for the first scenarios, i.e. with the Internet address being sent to the destination computer and the specific identity to the server 11. The SMS reply contains, in addition to the telephone number to the server and information that call connection is possible, an address listing including the Internet address for the Internet user. Each address list number corresponds to one of the Internet addresses in the GSM subscriber's address list in the server. These numbers can be stored in the mobile subscriber telephone's telephone number list.

In the event that a GSM subscriber forgets a number, the SMS procedure, as outlined above, can be effected in order to obtain the Internet address list number. The subscriber can also request a complete listing of the Internet address list, or search for a specific letter.

It will be seen, from the foregoing description of the second interconnection scenario, that a method, according to present invention, for enabling a mobile subscriber station of a cellular radio communication network to make an Internet telephone call to an Internet user, is characterised by the steps of:
(a) establishing and storing a list of Internet addresses for each mobile subscriber station user wishing to make Internet telephone calls;
(b) assigning, for each address in the Internet address list, a number which uniquely identifies these addresses;
(c) a user of said mobile subscriber station sending the following information to a telephony/Internet server using SMS:
information identifying the Internet address for said Internet user; and
the specific identity of said mobile subscriber station (for example, the telephone number for the mobile subscriber station);
(d) said telephony/internet server, in response to receipt of said information, sending an SMS to said mobile subscriber station, said SMS including the following information:
that connection to the Internet address is possible;
the server's telephone number; and
an address list number for the Internet address, each address list number corresponding to one of the Internet addresses in the mobile subscriber station user's address list in the telephony/Internet server;
(e) a user of said mobile subscriber station, on receipt of the SMS from the server, calling the server's telephone number;
(f) the telephony/Internet server, on receipt of the telephone call from the mobile subscriber station, transmitting a voice message to said mobile subscriber station requesting the user to key in an address list number; and
when said mobile subscriber station user keys in said address list number, said telephony/Internet server connects the user of said mobile subscriber station to an Internet user at the Internet address corresponding to the address list number; or
said telephony/Internet server, in the absence of a response from the Internet user, notifying the user of said mobile subscriber terminal by means of either a voice message, or tones, as in conventional telephony, that the Internet user is engaged, or is not replying, or does not have an Internet telephony application.

The advantage of the second interconnection scenario is that:
the service becomes more user-friendly; and
a conventional telephone (not having access to an SMS facility) with a DMTF function can be used to call an Internet user if the address list number is known.

In the case of the second, or more advanced scenario, outlined above, if a GSM subscriber has 32 addresses in his/her list and wants to connect a telephone call to a new address, then the following procedure would have to be effected:

(1) The GSM subscriber sends a call connect request, together with an enquiry about the Internet address's address list number in the server 11.

SMS: <internet address> (12 digits, or e-mail address)

(2) The server 11 stores the new address in the address list and sends back, to the GSM subscriber, the address list number, telephone number, and information that coupling is possible.

SMS: coupling to <internet address> is OK! Call <server telephone number>[pause]<address list number#> (list number in this case would be 33#, or the first vacant one)

(3) The GSM subscriber can now call the server's telephone number. On receipt of a call from the GSM subscriber, the server transmits a voice message requesting the user (by DMTF) to key in an address list number. On some GSM-compatible mobile stations/telephones, for example, the Ericsson GH388, a DMTF string can be added to the telephone number, after a pause symbol, before the connection is made. A telephone number sent by the server in SMS would then appear as follows: 0705110646p33#.

When the GSM subscriber has dialled the number and the address list number, the server 11 establishes an Internet connection to the destination address (possibly via at least one additional Internet telephony server, as outlined above). If the Internet user does not reply, the GSM subscriber is notified via either a speech message, or tones, as in conventional telephony. A notification message may be that the Internet user:

is engaged:

is not replying; or does not have an Internet telephony application.

As an alternative to SMS, the GSM service 'Alternate Speech/Data' could be used. The advantages of this alternative are that only one call coupling is required. With this alternative arrangement, the telephone call is initiated through data transfer of the Internet address to the server 11 from the mobile station/handset 8, after which the server 11 can connect the connection to the Internet party. The GSM access then connects over the speech, and the call can take place. The disadvantage of this solution is that data terminal functionality is required, for example, a computer, or advanced GSM mobile terminal, for example, the Nokia Communicator 9000 type. Note that this is not necessary if SMS is used as data carrier.

It will be seen from the foregoing description that the present invention relates to the manner in which a GSM subscriber can connect an Internet telephone call through the IP (Internet Protocol) address information being transferred via SMS and can, therefore, be used for an Internet telephony service based on GSM's speech service access. The use of the short message service (SMS), available in a mobile telephone terminal, to transfer an Internet address, or e-mail address with alphanumeric symbols, means that no additional equipment is required, such as, for example, a portable computer, to transfer Internet telephony calls to an Internet-connected called party.

The invention claimed is:

1. A communication system comprising:
   a cellular radio communication network including a short message service (SMS); and
   a telephony/Internet server adapted to facilitate establishment of a telephony/Internet connection between a mobile subscriber station of said cellular radio communication network and a specific Internet user the mobile subscriber station is seeking to be connected to,
   wherein said SMS is adapted to transfer inquiry information identifying an Internet address for said specific Internet user as part of a first SMS message from said mobile subscriber station to said telephony/Internet server and to transfer return information as a second SMS from said telephony/Internet server to said mobile subscriber station after receipt of the first SMS at said telephony/Internet server, said second SMS specifying at least if the telephony/Internet connection being sought by the mobile subscriber station is possible and the telephony/Internet server's telephone number.

2. The communication system as claimed in claim 1, wherein the Internet address for said specific Internet user identifies an Internet-connected computer terminal of said specific Internet user and said SMS further transfers a specific identity for said mobile subscriber station from the mobile subscriber station to said telephony/Internet server.

3. The communication system as claimed in claim 2, wherein said specific identity for said mobile subscriber station is a telephone number for said mobile subscriber station.

4. The communication system as claimed in claim 2, wherein said telephony/Internet server includes analysing means for effecting analysis to determine the telephone number identity of said mobile subscriber station on receipt of said SMS-transferred inquiry information.

5. The communication system as claimed in claim 1, wherein said telephony/Internet server includes means for establishing and storing an Internet address list of Internet addresses for each mobile subscriber station user subscribing to the system and each one of said Internet addresses has an Internet address list number.

6. The communication system as claimed in claim 5, wherein a mobile subscriber station is adapted to request from said telephony/Internet server, and said telephony/Internet server is adapted to supply to the mobile subscriber station, a complete listing of the Internet address list.

7. The communication system as claimed in claim 5, wherein each mobile subscriber station is adapted to search for a specific one of the Internet addresses stored by said telephony/Internet server.

8. The communication system as claimed in claim 1, wherein said cellular radio communication network is a GSM network.

9. A communication system comprising:
   a cellular radio communication network including a short message service (SMS); and
   a telephony/Internet server adapted to facilitate establishment of a telephony/Internet connection between a mobile subscriber station of said cellular radio communication network and a specific Internet user the mobile subscriber station is seeking to be connected to,
   wherein said SMS is adapted to transfer inquiry information identifying an Internet address for said specific Internet user from said mobile subscriber station to said telephony/Internet server and to transfer return information from said telephony/Internet server to said mobile subscriber station specifying at least if the telephony/Internet connection being sought by the mobile subscriber station is possible,
   wherein the Internet address for said specific Internet user identifies an Internet-connected computer terminal of said specific Internet user and said SMS further transfers a specific identity for said mobile subscriber station from the mobile subscriber station to said telephony/Internet server, and
   wherein said return information transferred to said mobile subscriber station by said SMS also includes the telephony/Internet server's telephone number.

10. The communication system as claimed in claim 9, wherein said telephony/Internet server is adapted, on receipt of a telephone call from said mobile subscriber station, the telephone call being made using the telephony/Internet server's telephone number provided to the mobile subscriber station as part of the return information, to:
    identify said mobile subscriber station making the telephone call;
    associate the telephone call with the Internet address previously transferred to said telephony/Internet server from said mobile subscriber station; and
    connect the telephone call to the Internet address.

11. The communication system as claimed in claim 10, wherein said telephony/Internet server is adapted to identify said mobile subscriber station making the telephone call using telephone number analyzing means.

12. The communication system as claimed in claim 11, wherein said Internet address is maintained associated with the telephone number of said mobile subscriber station for a specific period of time which is monitored by a system timer.

13. The communication system as claimed in claim 10, wherein said telephony/Internet server is adapted to connect the telephone call directly to the Internet address.

14. The communication system as claimed in claim 10, wherein said telephony/Internet server is adapted to connect the telephone call to the Internet address via at least one additional Internet server adapted to provide Internet telephony services that stands alone or as the last one of a chain of servers.

15. A communication system comprising:
    a cellular radio communication network including a short message service (SMS); and
    a telephony/Internet server adapted to facilitate establishment of a telephony/Internet connection between a mobile subscriber station of said cellular radio communication network and a specific Internet user the mobile subscriber station is seeking to be connected to,
    wherein said SMS is adapted to transfer inquiry information identifying an Internet address for said specific Internet user from said mobile subscriber station to said telephony/Internet server and to transfer return information from said telephony/Internet server to said mobile subscriber station specifying at least if the telephony/Internet connection being sought by the mobile subscriber station is possible,
    wherein said telephony/Internet server includes means for establishing and storing an Internet address list of Internet addresses for each mobile subscriber station user subscribing to the system and each one of said Internet addresses has an Internet address list number, and
    wherein said return information transferred to said mobile subscriber station by said SMS also includes the telephony/Internet server's telephone number and the Internet address list number corresponding to one of the Internet addresses in the Internet address list in the telephony/Internet server.

16. The communication system as claimed in claim 15, wherein said Internet address list numbers received by SMS from the telephony/Internet server are stored in a respective mobile subscriber station's telephone number list.

17. A communication system comprising:
a cellular radio communication network including a short message service (SMS); and
a telephony/Internet server adapted to facilitate establishment of a telephony/Internet connection between a mobile subscriber station of said cellular radio communication network and a specific Internet user the mobile subscriber station is seeking to be connected to,
wherein said SMS is adapted to transfer inquiry information identifying an Internet address for said specific Internet user from said mobile subscriber station to said telephony/Internet server and to transfer return information from said telephony/Internet server to said mobile subscriber station specifying at least if the telephony/Internet connection being sought by the mobile subscriber station is possible,
wherein said telephony/Internet server includes means for establishing and storing an Internet address list of Internet addresses for each mobile subscriber station user subscribing to the system and each one of said Internet addresses has an Internet address list number, and
wherein said telephony/Internet server is adapted, on receipt of an SMS-transferred connection request inquiry from a mobile subscriber station indicating an unlisted Internet address, to:
store, and assign an address list number to the received unlisted Internet address; and
transfer back to the mobile subscriber station, via SMS, the following return information to enable a user of said mobile subscriber station to call said unlisted Internet address:
a newly assigned address list number;
the telephony/Internet server's telephone number; and
information that a call connection is now possible to the previously unlisted Internet address.

18. A method for enabling a mobile subscriber station of a cellular radio communication network to make an Internet telephone call to a specific Internet user, comprising the steps of:
using a short message service (SMS) of the cellular radio communication network to send a first SMS message with inquiry information identifying the Internet address for said specific Internet user from said mobile subscriber station to a telephony/Internet server; and
sending return information as a second SMS message from said telephony/Internet server to said mobile subscriber station after receipt of the inquiry information by the telephony/Internet server, the second SMS message specifying at least if the telephony/Internet connection indicated by the Internet address for said specific Internet user is possible using the SMS and the telephony/Internet server's telephone number.

19. The method as claimed in claim 18, wherein the inquiry information transferred by SMS to said telephony/Internet server further includes a specific identity for said mobile subscriber station and the Internet address is the Internet address for an Internet-connected computer terminal of said specific Internet user.

20. The method as claimed in claim 19, wherein said specific identity of said mobile subscriber station is a telephone number for said mobile subscriber station.

21. The method as claimed in claim 19, further comprising the step of said telephony/Internet server receiving said SMS-transferred inquiry information and using telephone number analysis to determine the telephone number identity of said mobile subscriber station.

22. The method as claimed in claim 18, further comprising the step of said telephony/Internet server establishing and storing a list of Internet addresses for each mobile subscriber station user wishing to make Internet telephone calls as an Internet address list and providing each one of said Internet addresses with a corresponding address list number.

23. The method as claimed in claim 22, further comprising the step of said mobile subscriber station requesting a complete listing of the Internet address list from said telephony/Internet server.

24. The method as claimed in claim 22, further comprising the step of said mobile subscriber station searching for a specific one of the Internet addresses stored by said telephony/Internet server.

25. The method as claimed in claim 18, wherein said cellular radio communication network is a GSM network.

26. A method for enabling a mobile subscriber station of a cellular radio communication network to make an Internet telephone call to a specific Internet user, comprising the steps of:
transferring inquiry information identifying the Internet address for said specific Internet user received from said mobile subscriber station to a telephony/Internet server using a short message service (SMS) of the cellular radio communication network; and
transferring return information from said telephony/Internet server to said mobile subscriber station specifying at least if the telephony/Internet connection indicated by the Internet address for said specific Internet user is possible using the SMS,
wherein the inquiry information transferred by SMS to said telephony/Internet server further includes a specific identity for said mobile subscriber station and the Internet address is the Internet address for an Internet-connected computer terminal of said specific Internet user, and
wherein the return information transferred to said mobile subscriber station by said SMS includes the telephony/Internet server's telephone number.

27. The method as claimed in claim 26, further comprising the steps of:
said mobile subscriber station placing a telephone call to the telephony/Internet server's telephone number received as part of the SMS-transferred return information; and
said telephony/Internet server then receiving the telephone call from said mobile subscriber station and performing the sub-steps of:
identifying said mobile subscriber station making the telephone call;
associating the telephone call with the Internet address previously transferred to said server by from said mobile subscriber station; and
connecting the telephone call to the Internet address.

28. The method as claimed in clam 27, further comprising the step of said telephony/Internet server identifying said mobile subscriber station making the telephone call using telephone number analysis.

29. The method as claimed in claim 28, further comprising the step of the telephony/Internet server associating said Internet address with the telephone number of said mobile subscriber station for a specific monitored period of time.

30. The method as claimed in claim 27, further comprising the step of said telephony/Internet server connecting the telephone call directly to the Internet address.

31. The method as claimed in claim 27, further comprising the step of said telephony/Internet server connecting the telephone call to the Internet address via at least one additional Internet server adapted to provide Internet telephony services that stands alone or as the last one of a chain of servers.

32. A method for enabling a mobile subscriber station of a cellular radio communication network to make an Internet telephone call to a specific Internet user, comprising the steps of:

transferring inquiry information identifying the Internet address for said specific Internet user received from said mobile subscriber station to a telephony/Internet server using a short message service (SMS) of the cellular radio communication network;

transferring return information from said telephony/Internet server to said mobile subscriber station specifying at least if the telephony/Internet connection indicated by the Internet address for said specific Internet user is possible using the SMS; and said telephony/Internet server responding to receipt of said SMS-transferred information from said mobile subscriber station with further SMS transferred return information including the server's telephone number and an address list number for the Internet address corresponding to one of the Internet addresses in the address list of Internet addresses for each mobile subscriber station user wishing to make Internet telephone calls in the telephony/Internet server.

33. The method as claimed in claim 32, further comprising the step of said mobile subscriber station receiving said address list numbers by SMS from the telephony/Internet server and storing said received address list numbers in a respective mobile subscriber station's telephone number list.

34. A method for enabling a mobile subscriber station of a cellular radio communication network to make an Internet telephone call to a specific Internet user, comprising the steps of:

transferring inquiry information identifying the Internet address for said specific Internet user received from said mobile subscriber station to a telephony/Internet server using a short message service (SMS) of the cellular radio communication network;

transferring return information from said telephony/Internet server to said mobile subscriber station specifying at least if the telephony/Internet connection indicated by the Internet address for said specific Internet user is possible using the SMS;

said telephony/Internet server establishing and storing a list of Internet addresses for each mobile subscriber station user wishing to make Internet telephone calls as an Internet address list and providing each one of said Internet addresses with a corresponding address list number; and said telephony/Internet server receiving an SMS-transferred connection request from a mobile subscriber station indicating an unlisted Internet address, said telephony/Internet server then:

storing, and assigning an address list number to the unlisted Internet address; and sending back to the mobile subscriber station, via SMS, information to enable a user of said mobile subscriber station to call said unlisted Internet address as follows:

a newly assigned address list number;

the telephony/Internet server's telephone number; and an indication that a call connection is now possible to the previously unlisted Internet address.

35. A method for enabling a mobile subscriber station of a cellular radio communication network to make an Internet telephone call to an Internet user, comprising the steps of:

a user of said mobile subscriber station sending the following to a telephony/Internet server using a short message service (SMS) of the cellular radio communication network:

information identifying the Internet address for said Internet user; and information specifically identifying said mobile subscriber station;

said telephony/Internet server responding to receipt of said information by sending a return SMS to said mobile subscriber station, said return SMS including:

information indicating that connection to said Internet address is possible; and the telephony/Internet server's telephone number;

a user of said mobile subscriber station receiving the return SMS from the server with the telephony/Internet server's telephone number and then placing a telephone call to the telephony/Internet server's telephone number; and the server receiving the telephone call from the mobile subscriber station then performing the steps of:

identifying the mobile subscriber station as placing the telephone call;

associating the telephone call with the Internet address previously received in the SMS from the mobile subscriber station; and connecting the telephone call to the Internet address.

36. A method for enabling a mobile subscriber station of a cellular radio communication network to make an Internet telephone call to an Internet user, comprising the steps of:

establishing and storing a list of Internet addresses for each mobile subscriber station user wishing to make Internet telephone calls;

assigning, for each address in the Internet address list, a number which uniquely identifies these addresses;

a user of said mobile subscriber station sending inquiry information to a telephony/Internet server using a short message service (SMS) of the cellular radio communication network, the inquiry information including information identifying the Internet address for said Internet user and a specific identity of said mobile subscriber station;

said telephony/Internet server receiving said inquiry information and sending return information to said mobile subscriber station using said SMS, the return information including an indication that connection to said Internet address is possible, the telephony/Internet server's telephone number, and an address list number, each address list number corresponding to one of the Internet addresses in the mobile subscriber station user's address list in the telephony/Internet server;

a user of said mobile subscriber station receiving the return information via SMS from the telephony/Internet server then placing a telephone call to the telephony/Internet server's telephone number included with the return information;

the telephony/Internet server receiving the telephone call from the mobile subscriber station then transmitting a voce message to said mobile subscriber station requesting the user to key in an address list number;

said mobile subscriber station user then keying in said address list number; and said telephony/Internet server then connecting the user of said mobile subscriber station to an Internet user at the Internet address corresponding to the keyed in address list number.

37. The method as claimed in claim 36, said telephony/Internet server responding to an absence of a response from the Internet user at the Internet address corresponding to the keyed in address list number by notifying the user of said mobile subscriber terminal by means of either a voice message, or tones.

38. The method as claimed in claim 37, said voice message being that the Internet user is engaged, or is not replying, or does not have an Internet telephony application.

* * * * *